United States Patent [19]

Qureshi et al.

[11] 4,004,226

[45] Jan. 18, 1977

[54] QAM RECEIVER HAVING AUTOMATIC ADAPTIVE EQUALIZER

[75] Inventors: Shahid U. H. Qureshi, Newton; George D. Forney, Jr., Cambridge, both of Mass.

[73] Assignee: Codex Corporation, Newton, Mass.

[22] Filed: July 23, 1975

[21] Appl. No.: 598,252

[52] U.S. Cl. .................................. 325/42; 325/323; 333/18

[51] Int. Cl.² .......................................... H04B 3/04

[58] Field of Search ............ 333/18, 70 T; 325/42, 325/321, 323

[56] References Cited

UNITED STATES PATENTS

| | | | |
|---|---|---|---|
| 3,723,911 | 3/1973 | Forney, Jr. ........................ | 333/18 |
| 3,757,221 | 9/1973 | Moehrmann ...................... | 325/42 |
| 3,758,881 | 9/1973 | Rummler .......................... | 333/18 X |
| 3,783,386 | 1/1974 | Sato .................................. | 325/321 |
| 3,868,603 | 2/1975 | Guidoux ........................... | 333/18 |
| 3,879,664 | 4/1975 | Monsen ............................ | 325/321 X |
| 3,906,347 | 9/1975 | Mottey et al. .................... | 325/42 |

*Primary Examiner*—Paul L. Gensler

[57] ABSTRACT

In a high speed QAM data communications receiver of the type adapted to receive bursts of signals having a bandwidth B Hz and sent at a predetermined rate of 1/T signals per second over a channel, wherein the receiver includes an automatic adaptive equalizer having taps spaced equally apart, tap coefficient circuitry for repeatedly multiplying the output of each tap by a respective tap coefficient, and adjustment circuitry for adjusting the tap coefficients, and output circuitry responsive to the equalizer for providing output signals at times $kT + \tau$, $k = 0, 1, \ldots$, where $\tau$ is a timing epoch, that improvement wherein the taps are spaced apart by $T/n$ seconds, where $n$ is greater than TB, and control circuitry is provided for early actuation of the adjustment circuitry to begin adjustment of the tap coefficients and hence training of the equalizer regardless of the initial value of the timing epoch, whereby the data capacity of the receiver is increased by reduction of the time required for set up of the receiver.

11 Claims, 4 Drawing Figures

QAM RECEIVER HAVING AUTOMATIC ADAPTIVE EQUALIZER

BACKGROUND OF THE INVENTION

This invention relates to automatic adaptive equalizers such as are used in high speed quadrature-amplitude modulation (QAM) data communications equipment. (The term QAM is used herein broadly to include all systems in which the transmitted signal can be represented as the superposition of two modulated signals, each being obtained by pulse-amplitude modulation of a signal sequence on a sinusoidal carrier, the two signal sequences being generated in synchronism at the same rate, and the two carriers being of the same frequency but 90° apart in phase. QAM thus includes a wide variety of double sideband systems, including pure phase modulation and combined amplitude and phase modulation.) The invention is particularly useful in a multi-point data transmission system in which a central station communicates with a number of remote stations.

It is common practice to adapt the equalizer in a receiver to the particular channel and transmitter from which it is to receive a signal burst, by using a known training sequence as part of a preamble of the burst. One review of prior equalization art is Proakis and Miller, IEEE Trans. Inf. Theo., Vol. IT-15, No. 4, 1969.

Typically, the preamble also includes signals for initial adjustment of other receiver parameters. In particular, the first segment of the preamble typically contains a sequence for initialization of the timing recovery circuitry, to optimize the timing epoch $\tau$, where output signals are put out by the receiver at times $kT + \tau$, $k = 0, 1, \ldots$, the receiver being adapted to receive signals as $1/T$ signals per second. The timing recovery sequence precedes the equalizer training sequence in conventional systems because improper setting of $\tau$ may interfere with proper equalization.

SUMMARY OF THE INVENTION

The invention makes possible training of the equalizer without regard for the value of the timing epoch, so that the timing recovery segment of the preamble preceding the training sequence may be eliminated. Accordingly, equalizer training may begin as soon as signals reach the desired principal tap coefficient location in the equalizer, and the overall length of time required for set up of the receiver is thus substantially shortened, increasing the data capacity of the receiver. This is particularly important in multi-point operation, where the central receiver must repeatedly adapt itself to communication with different remote transmitters. In addition, the insensitivity of the equalizer of the invention to timing epoch makes possible simplification of the timing recovery circuit. Further, the overall delay length of the equalizer may be reduced.

In general, the invention features spacing the equalizer taps apart by $T/n$ seconds, where n is greater than TB, where B Hz is the bandwidth of the transmitted signal, and providing control circuitry for early actuation of the equalizer tap adjustment circuitry to begin adjustment of the tap coefficients and hence training of the equalizer regardless of the initial value of the timing epoch. In preferred embodiments the receiver includes detection circuitry for detecting the beginning of an incoming burst of signals, and the control circuitry comprises means for actuating the adjustment circuitry within a predetermined time interval after such detection, wherein that time interval is preferably less than the total delay length of the equalizer; n is an integer preferably equal to 2; the receiver includes sampling circuitry for sampling received signals at a rate of $n/T$ samples per second and providing the samples to the equalizer; the receiver is part of a central station in a multi-point transmission system having in addition a central transmitter and a number of remote transmitter/receiver stations, and each remote transmitter is adapted to send a training sequence as a preamble of each burst, and the control circuitry of the central receiver comprises means to actuate the adjustment circuitry to begin training of the equalizer with the first signals in the preamble; the receiver includes timing recovery circuitry for adjusting $\tau$, and the control circuitry comprises means for actuating the adjustment circuitry prior to any substantial adjustment in $\tau$ by the timing recovery circuitry; the control circuitry comprises means for actuating the adjustment circuitry to begin training of the equalizer when the first signal in the burst has arrived at a pre-selected tap position in the equalizer at which it is desired to locate the principal tap coefficient; and the timing recovery circuitry comprises means for keeping the principal tap coefficient within a predetermined number of taps from the center of the equalizer.

T/2 tap spacing in an equalizer is disclosed in Lucky U.S. Pat. No. 3,617,948, in a single sideband (SSB) receiver, although without suggestion of the present invention. (Since correct setting of initial local carrier phase is important in SSB and vestigial sideband (VSB) receivers, an initial segment of preamble is normally required in such receivers to set up the carrier recovery circuit, so that use of T/2 tap spacing would not substantially reduce preamble length, even though it would make equalizer performance relatively independent of timing epoch.) Lucky employs the odd numbered taps to do spectral shaping, simplifying his low pass filter. In some instances receivers embodying the present invention may also carry out some spectral shaping in the equalizer, although for fast training a good quality low pass filter is still necessary to facilitate rapid convergence of the tap coefficients and optimum equalizer performance.

Other advantages and features of the invention will be apparent from the description and drawings herein of a preferred embodiment thereof.

DESCRIPTION OF THE PREFERRED EMBODIMENT

Figure 1:
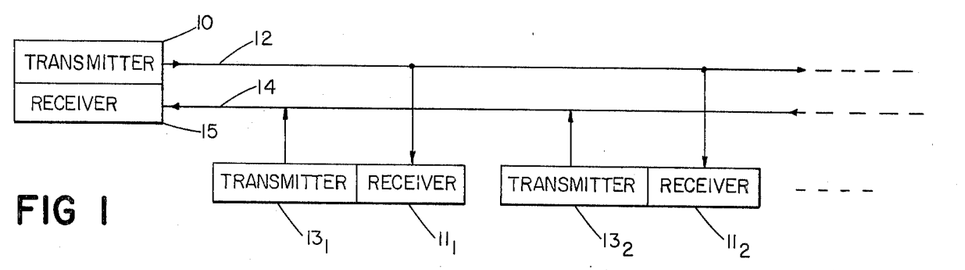
FIG. 1 is a schematic diagram of a multi-point data communications system.

FIG. 1 is a block diagram of a multi-point data transmission system. A single transmitter 10 at a central site broadcasts data and control information to a number of remote receivers $11_1$, $11_2$, . . . on a common outbound line 12. In return, the remote transmitters $13_1$, $13_2$, . . . transmit over a common return line 14 to the central site receiver 15. The remote transmitters are selected in turn by the central site transmitter to send non-overlapping bursts of signals. Each burst includes information preceded by a preamble that allows the central site receiver to initialize and prepare itself for data reception from that transmitter. The preamble represents overhead time that is wasted for data transmission purposes, and therefore should be minimized.

Figure 2:
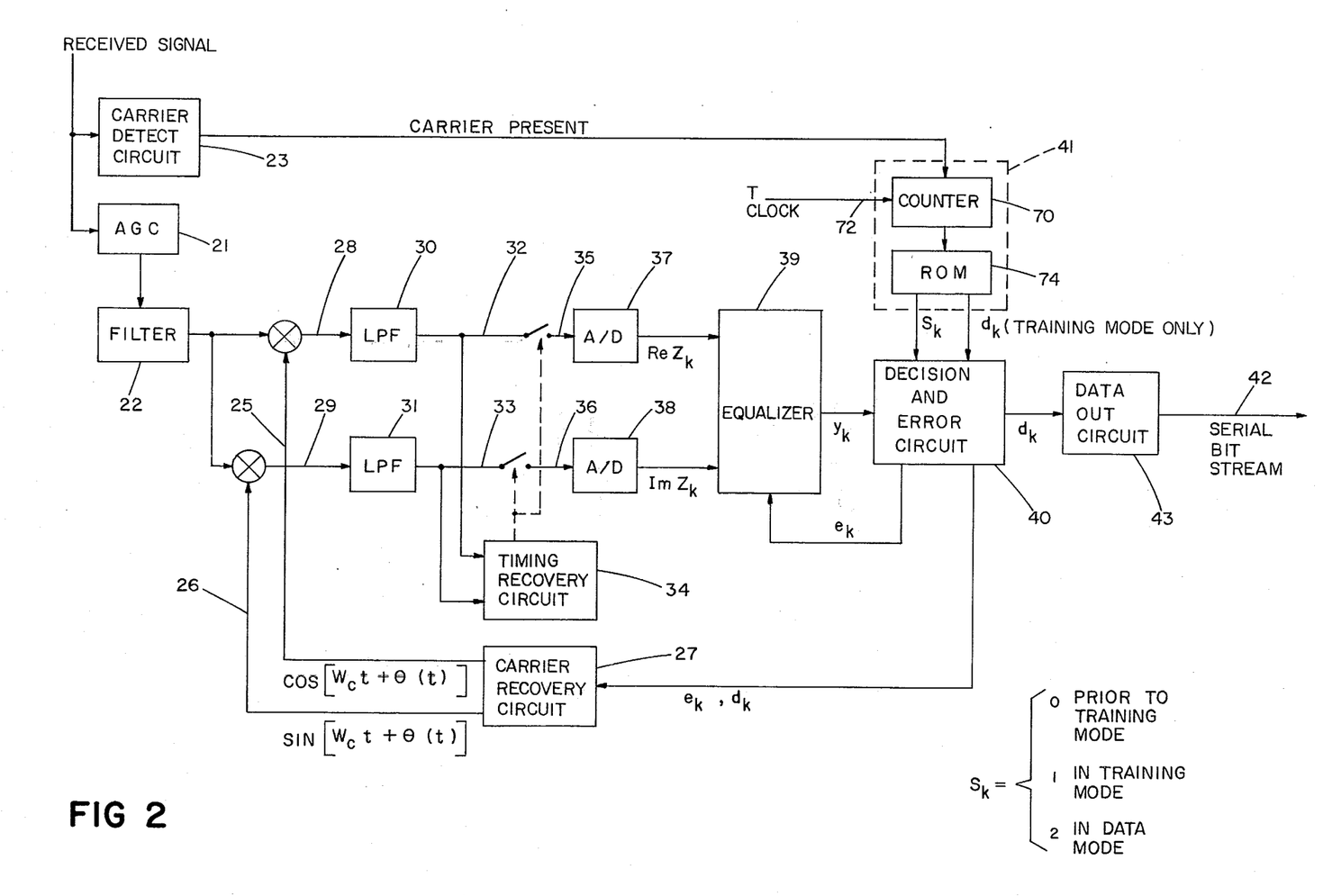
FIG. 2 is a schematic diagram of a receiver embodying the invention.

FIG. 2 is a block diagram of a receiver for a QAM modem. The received signal is passed through an automatic gain control (AGC) circuit 21 that normalizes the received power, and a filter 22 that rejects out-of-band noise. A carrier detect circuit 23 monitors the received signal and puts out a "carrier present" logic signal when the power in the received signal exceeds a predetermined threshold level. The output of the AGC and filter is demodulated by both an in-phase local carrier 25, $\cos[W_c t + \theta(t)]$, and a quadrature local carrier 26, $\sin[W_c t + \theta(t)]$, which are generated by a carrier recovery circuit 27. Here $W_c$ is the nominal carrier frequency in radians/sec and $\theta(t)$ is the instantaneous phase of the carriers generated by the carrier recovery circuit. The in-phase and quadrature demodulated signals 28 and 29 are passed through identical low-pass filters (LPFs) 30 and 31 to remove unwanted second harmonic terms and provide some spectral shaping of the data signal. The filtered outputs 32 and 33 are sampled at intervals determined by a timing recovery circuit 34 whose inputs are the filtered outputs 32 and 33. In conventional receivers the sampling occurs at times $kT + \tau$, $k = 0, 1, 2, \ldots$, $k$ is an index denoting the sampling time. The sampled outputs 35 and 36 are digitized in A/D converters 37 and 38, and the two resulting digital numbers $ReZ_k$ and $ImZ_k$ are regarded as the real and imaginary parts of a complex signal value $$Z_k = ReZ_k + iImZ_k$$

where $$i = \sqrt{-1}, k = 0, 1, 2, \ldots.$$

The complex numbers $Z_k$ then pass through a complex baseband equalizer 39, which uses complex arithmetic to compute complex equalized output values according to the formula $$y_k = \sum_{j=0}^{N-1} g_j Z_{k-j}.$$

where the N tap coefficients $g_j$, $0 \leq j \leq N-1$, are digital complex numbers that are stored in the equalizer and determine its characteristics. Finally, the equalized outputs $y_k$ are entered into a decision-and-error circuit 40 which in data (decision-directed) mode decides which complex data signal $d_k$ must have been sent by the transmitter, and then computes the complex apparent error signal $e_k = y_k - d_k$. During training mode (initial adjustment of the equalizer) the transmitter sends known, predetermined data signals $d_k$ which are also generated in the receiver by training mode control circuit 41 to compute the error signal $e_k$. The error signal is used to adjust the equalizer tap coefficients $g_j$ and the carrier recovery circuit phase. The decisions $d_k$ represent the transmitted data and are converted to a serial bit stream 42 in a data out circuit 43 for delivery to the user.

The place where analog-to-digital conversion occurs in such a receiver is a design choice that is highly conditioned by the available technology. In early implementations the equalizer was often implemented as an analog transversal or tapped-delay-line filter, whose output was sampled at T-second intervals to give the equalized outputs $y_k$. More recent implementations realize nearly the whole receiver digitally, with digitization immediately after the AGC.

The initial adjustment of such a receiver is conventionally performed as follows. The remote transmitter first sends a very simple first segment of the preamble with strong spectral components at the band edges of the transmitted spectrum. The receiver carrier detect circuit detects the appearance of energy on the line and causes the receiver to start its initialization or training procedure. The AGC is put into a fast, high-gain mode and quickly establishes the proper signal level. The timing recovery circuit uses the strong band-edge spectral components to make an initial determination of the best sampling epoch $\tau$. The carrier recovery circuit may also initialize its phase and frequency at this time, although in a QAM system with a complex equalizer this is not necessarily required since the equalizer is capable of removing any phase offset, and frequency offsets are typically not bothersome. The remote transmitter then changes to a pseudo-random training pattern suitable for training the equalizer.

In a conventional system of the general type described thus far the setting of the sampling epoch $\tau$ determines the effective sampled-data frequency response of the channel, which the equalizer must equalize. Improper setting of $\tau$ may make the equalizer's job more difficult or impossible; the residual intersymbol interference after equalization is strongly a function of $\tau$. Therefore the initial setting of $\tau$ during the first segment of the preamble is critical.

According to the invention, equalizer performance is made practically independent of $\tau$ by taking the samples in FIG. 2 at intervals of T/2 seconds, and by making the equalizer tap spacing T/2 seconds. For typical channels the equalization performance (residual intersymbol interference) with N taps spaced T/2 seconds apart and with any sampling epoch is comparable to the performance of a conventional equalizer with the same number N of taps spaced T seconds apart with the optimal sampling epoch, even though the time-domain response of the equalizer of the invention is only half as long. The criticality of the sampling epoch $\tau$ is thus eliminated with no economic penalty.

A principal feature of the invention is elimination of the first segment from the conventional training preamble. The transmitter may now simply start with a pseudo-random training sequence; the receiver detects the beginning of a signal burst when energy appears on the line and starts adjusting the equalizer without initializing the sample timing epoch or local carrier phase. (As before, the AGC can be made to settle very quickly.)

Figure 3:
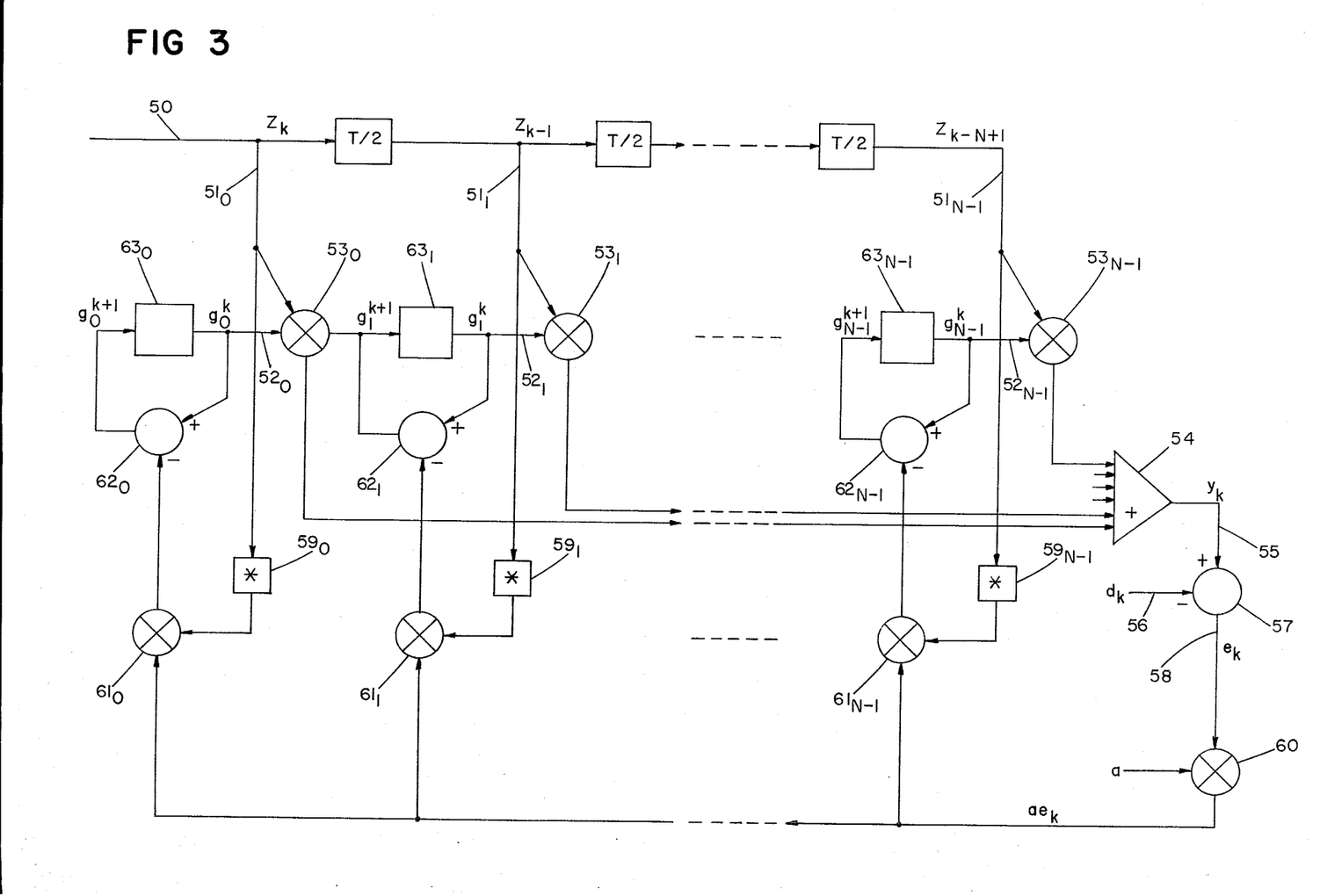
FIG. 3 is a schematic diagram of an equalizer embodying the invention.

A suitable adjustment algorithm for the equalizer is the so-called least-mean-squares (LMS) algorithm of Widrow and Hoff (1960 WESCON Convention Record, IRE, Pt. 4, pp. 96-104), as described in complex form by Proakis and Miller, supra. The procedure is illustrated in FIG. 3, which is a schematic representation of a complex equalizer with taps spaced T/2 seconds apart. The equalizer inputs 50, a sequence of complex numbers $Z_k$ representing the LPF outputs sampled T/2 seconds apart, are available at the taps $51_0, 51_1, \ldots, 51_{N-1}$ with delays of O, T/2, ..., (N-1) T/2 seconds respectively. At times $kT + \tau$, $k = 0, 1, \ldots$, the tap outputs are multiplied by the complex tap coefficients $52_0, 52_1, \ldots, 52_{N-1}$ in complex multipliers $53_0, 53_1, \ldots, 53_{N-1}$ and the outputs are summed in the complex adder 54 to form the complex equalized output $55(y_k)$. The complex transmitted signal $56(d_k)$, which is known during training mode, is subtracted from 55 in complex subtractor 57 to form a complex error signal $58(e_k)$. Each tap coefficient $g_j^k$ is then adjusted to a new value $g_j^{k+1}$ according to error signal $e_k$ and the tap values $Z_{k-j}$, $O \leq j \leq N-1$, by the following rule:

$$g_j^{k+1} = g_j^k - ae_k Z_{k-j}^*,$$

where $a$ is a small real constant and $Z_{k-j}^*$ is the complex conjugate of $Z_{k-j}$. The rule is implemented by complex conjugators $59_0, 59_1, \ldots, 59_{N-1}$, complex multiplier 60, complex multipliers $61_0, 61_1, \ldots, 61_{N-1}$, complex subtractors $62_0, 62_1, \ldots, 62_{N-1}$, and complex registers $63_0, 63_1, \ldots, 63_{N-1}$ storing the tap coefficients.

Initially all tap coefficients are set to zero. At a predetermined time (approximately half the total delay length of the equalizer in the present embodiment, and preferably no greater than the total delay length of the equalizer to obtain maximum advantage of the invention) after the carrier detect circuit indicates the onset of signal energy on the line, such that the main pulse due to the first preamble signal $d_0$ should be approximately in the center of the equalizer (or other desired position of the principal equalizer tap coefficient), the adjustment algorithm commences, using $d_0$ as the first desired output signal in forming the first error signal $e_0 = y_0 - d_0$ ($= -d_0$, since $y_0 = 0$). The adjustment algorithm then proceeds as indicated above, with adjustments of every tap coefficient every T seconds thereafter. The implementation of the above sequence is shown in FIG. 2. Training mode control 41 has a counter circuit 70 which is set to zero upon receipt of the carrier present signal from circuit 23. The T clock pulse 72 increments the counter by one for each signalling interval T. Read only memory circuit 74 stores the sequences of $d_k$'s forming the training preamble. The T clock pulse causes circuit 70 to emit index $k$ (the number of intervals T since carrier present), which in turn causes circuit 74 to feed to decision and error circuit 40 the preamble $d_k$'s at the desired times (i.e., in the present embodiment, beginning at half the equalizer length after carrier present). Circuit 74 also stores and feeds to circuit 40 a control signal $S_k$, which is 0 prior to training mode, 1 during training mode, and 2 during data mode, to cause the decision and error circuit to operate in the desired mode, and to initialize the equalizer tap coefficients to zero prior to training mode.

Another consequence of the insensitivity of the T/2-spaced equalizer to timing epoch is that the timing recovery circuit can be simplified. Any timing update algorithm that tends to keep the principal equalizer tap coefficients near the center of the equalizer can be used. Indeed, if initially the principal coefficients appear off-center due to inaccurate initial synchronization, they can be slewed back to the preferred center positions by gradual timing adjustments without interruption of data transmission, provided that adjustments are slow enough that the equalizer coefficients can continually adapt in response. It will be apparent from the discussion of the equalizer above that a feature of the invention is that equalizer training begins prior to any substantial adjustment of $\tau$ by the timing recovery circuit.

Figure 4:
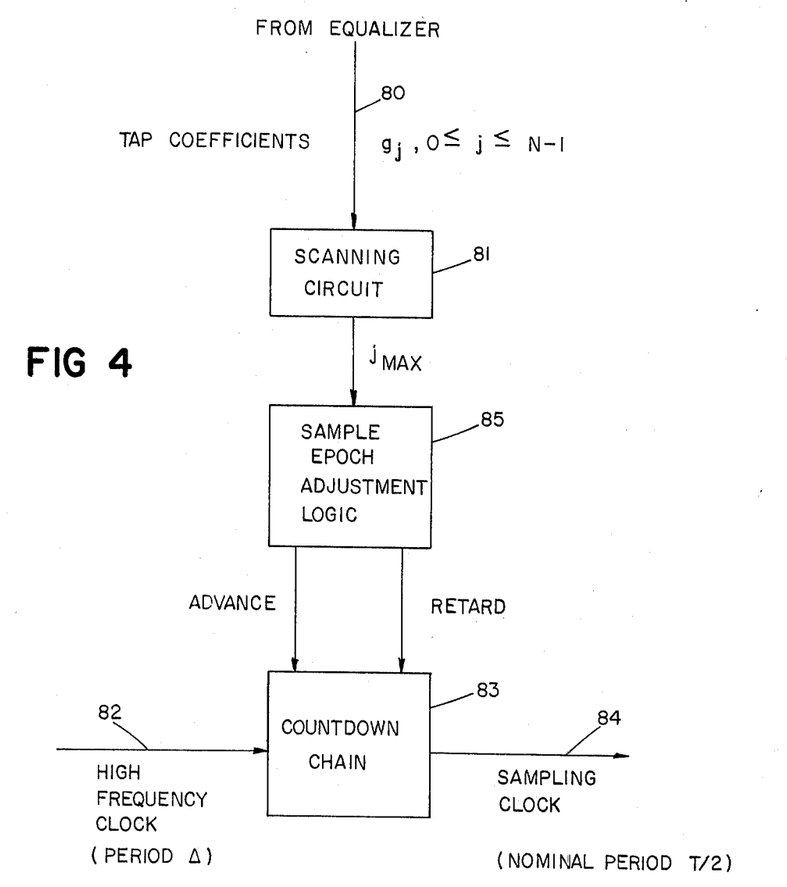
FIG. 4 is a schematic diagram of a timing recovery circuit.

FIG. 4 illustrates a representative timing recovery circuit of this type. During each signalling interval T the equalizer tap coefficients 80 are searched by scanning circuit 81, which determines the index $j_{max}$ of the tap coefficient $g_j$ of largest magnitude. If $j_{max}$ is less than the desired value, say $j_0$, then the epoch of the sampling clock is advanced by some small increment $\Delta$; if $j_{max}$ is greater than $j_0$, then the sampling epoch is retarded by $\Delta$, while if $j_{max} = j_0$, no adjustment is made. This can be done, for example, as follows: let $\Delta$ be chosen so that $T/2 = M\Delta$, where $M$ is a large integer; then use a high-frequency clock 82 of period $\Delta$ and a divide-by-$M$ countdown chain 83 to generate the sample time clock 84, with a nominal period of T/2; finally, when the sampling time adjustment logic 85 indicates "advance," arrange the countdown chain to count to (divide) by M-1 instead of M, and on "retard" count to M+1. Thus the index of the largest tap coefficient will tend to move toward $j_0$ and remain there. The rate of timing epoch change depends on the value of $\Delta$, which should be chosen sufficiently small that the equalizer tap coefficients can adapt in response to changes in the timing epoch.

Another advantage of the T/2-spaced equalizer is that it has approximately half the delay of the conventional equalizer, since the total number of adjustable taps required for a given equalizer is not changed by T/2 spacing. This means less delay in starting to receive transmissions from remote transmitters, and thus yields another reduction in overhead time in multi-point applications. Also, since the equalizer is in the carrier recovery loop in FIG. 2, it allows faster carrier tracking, which is of particular advantage during initial training.

Tap spacings T/n other than T/2 may be used, provided that the demodulated and low-pass-filtered signal has no significant spectral components above ($n/2T$) Hz. If the bandwidth of the transmitted signal is B Hz, then the demodulated signal will have no significant spectral components above B/2 Hz, so that the constraint on $n$ is that $n$ be greater than TB. It is impossible in principle (by Nyquist's sampling theorem) for TB to be less than 1, but in QAM modems that use bandwidth efficiently TB is typically not much greater than 1. Therefore, $n$ could usually be smaller than 2, which might be of advantage when analog equalizers using tapped delay lines are used. In the broadest view of the invention n need not be an integer. However, it is very convenient to have T/n an integer fraction of the signalling interval T in order that the equalizer output may be sampled at intervals of T seconds without interpolation, particularly in digital implementations. Since there are normally no spectral components above (1/T) Hz, there is normally no advantage to going to n = 3 or higher integer fractions, so $n = 2$ is the preferred choice.

Other embodiments (e.g., QAM systems using bandpass equalizers, as to which the same constraints on $n$ apply, etc.) are within the following claims.

What is claimed is:

1. In a QAM receiver of the type adapted to receive bursts of signals having a bandwidth B Hz and sent at a predetermined rate of 1/T signals per second over a channel, wherein the receiver includes
an automatic adaptive equalizer having
taps spaced equally apart,
tap coefficient circuitry for multiplying the output of each tap by a respective tap coefficient, and
adjustment circuitry for adjusting said tap coefficients,
output circuitry responsive to said equalizer for providing output signals at times $kT + \tau, k = 0, 1, \ldots$, where $\tau$ is a timing epoch, and
detection circuitry for detecting the presence of an incoming burst of signals at a predetermined position in said receiver,
that improvement wherein said taps are spaced apart by $T/n$ seconds, where $n$ is greater than TB, and control circuitry is provided for early actuation of said adjustment circuitry at a predetermined time dependent upon the time of said detection, to begin adjustment of said tap coefficients and hence training of said equalizer regardless of the initial value of said timing epoch, whereby the data capacity of said receiver is increased by reduction of the time required for set up of said receiver.

2. The improvement of claim 1 wherein said detection circuitry comprises means for detecting the arrival of an incoming burst of signals at said receiver, and said control circuitry comprises means for actuating said adjustment circuitry within a predetermined time interval after such detection.

3. The improvement of claim 2 wherein said predetermined time interval is less than the total delay length of said equalizer.

4. The improvement of claim 1 wherein $n$ is an integer greater than 1.

5. The improvement of claim 4 wherein $n = 2$.

6. The improvement of claim 1 wherein said receiver includes sampling circuitry for sampling received signals at a rate of $n/T$ samples per second and providing said samples to said equalizer.

7. The improvement of claim 1 wherein said receiver is part of a central station in a multi-point transmission system having in addition a central transmitter and a number of remote transmitter/receiver stations.

8. The improvement of claim 1 wherein said receiver includes timing recovery circuitry for adjusting $\tau$, and said control circuitry comprises means for actuating said adjustment circuitry prior to any substantial adjustment in $\tau$ by said timing recovery circuitry.

9. The improvement of claim 1 wherein said control circuitry comprises means for actuating said adjustment circuitry to begin training of said equalizer when the first signal in said burst has arrived at a pre-selected tap position in said equalizer at which it is desired to locate the principal tap coefficient.

10. The improvement of claim 1 wherein said receiver includes timing recovery circuitry comprising means for establishing and keeping the principal said tap coefficient within a predetermined number of taps from the center of said equalizer.

11. The improvement of claim 7 wherein each said remote transmitter is adapted to send a training sequence as a preamble of each said burst, and said control circuitry of said central receiver comprises means to actuate said adjustment circuitry to begin training of said equalizer with the first signals in said preamble.

* * * * *

UNITED STATES PATENT AND TRADEMARK OFFICE
CERTIFICATE OF CORRECTION

PATENT NO. : 4,004,226

DATED : January 18, 1977

INVENTOR(S) : Shahid U. H. Qureshi and George D. Forney, Jr.

It is certified that error appears in the above-identified patent and that said Letters Patent are hereby corrected as shown below:

Col. 1, line 36, "as" should be --at--.

Col. 3, line 31, --where T is the signalling interval, $\tau$ is the timing epoch, and-- should appear between the final comma and the final "k".

Col. 3, line 52, "O" should be --0--.

Col. 4, lines 44 and 47, "any" and "optimal" should be italicized.

Col. 5, line 2, "O" should be "0".

Col. 5, line 13, "O" should be "0".

Col. 5, line 19, "$Z_{k-j}$" should be --$Z^*_{k-j}$--.

Col. 5, line 46, "sequences" should be --sequence--.

Col. 6, line 48, "principal" should be --principle--.

Except for the words "any" and "optimal" referred to above, the entire patent should have been printed without italics.

UNITED STATES PATENT AND TRADEMARK OFFICE
CERTIFICATE OF CORRECTION

PATENT NO. : 4,004,226            Page 2 of 2

DATED : January 18, 1977

INVENTOR(S) : Shahid U. H. Quershi and George D. Forney, Jr.

It is certified that error appears in the above—identified patent and that said Letters Patent are hereby corrected as shown below:

The following should <u>not</u> have been printed in bold face type:

Col. 4, lines 40, 41, 43, and 66; Col. 5, lines 2 and 58, the denominator of "T/2".

Col. 5, line 2, "(N-1)".

Col. 5, line 13, "-1".

Col. 6, line 51, "2,".

In addition, the use of bold face type for numbers other than reference numerals and Figure numbers was erroneous.

$\mathfrak{Signed}$ and $\mathfrak{Sealed}$ this

*ninth* $\mathfrak{Day}$ of *August 1977*

[SEAL]

*Attest:*

RUTH C. MASON
*Attesting Officer*

C. MARSHALL DANN
*Commissioner of Patents and Trademarks*

Notice of Adverse Decision in Interference

In Interference No. 100,015, involving Patent No. 4,004,226, S. U. H. Qureshi and G. D. Forney, Jr., QAM RECEIVER HAVING AUTOMATIC ADAPTIVE EQUALIZER, final judgment adverse to the patentees was rendered June 10, 1980, as to claims 1–6, 9 and 10.

[*Official Gazette September 30, 1980.*]